Figure 1:
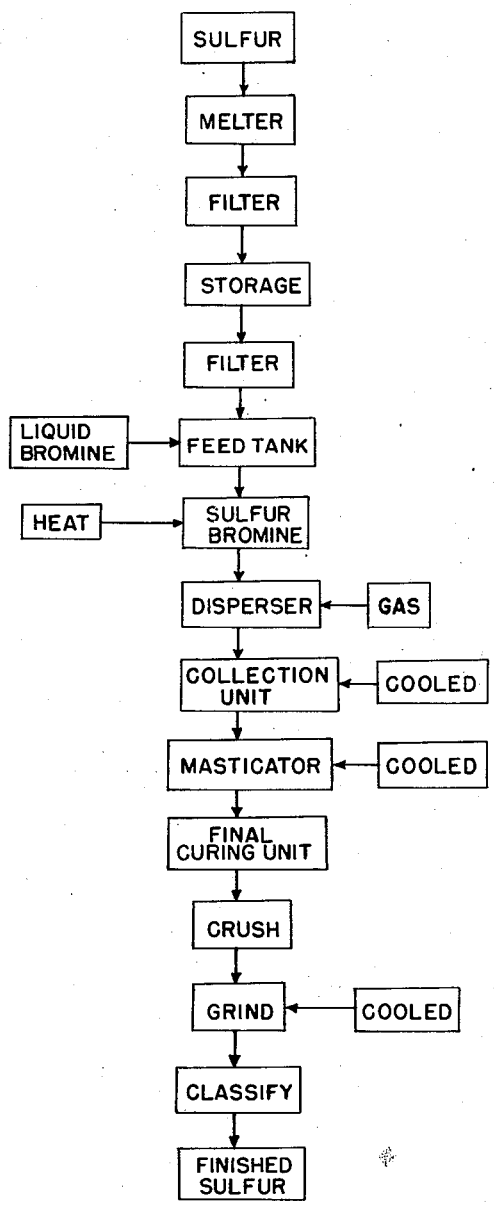

Sept. 25, 1951     G. H. GROVE     2,569,375
MANUFACTURE OF SULFUR

Filed July 24, 1947     2 Sheets-Sheet 1

INVENTOR.
George H. Grove
BY
ATTORNEY

Sept. 25, 1951          G. H. GROVE          2,569,375
MANUFACTURE OF SULFUR

Filed July 24, 1947          2 Sheets-Sheet 2

INVENTOR
GEORGE H. GROVE
By Robert L. Sibley
ATTORNEY

Patented Sept. 25, 1951

2,569,375

UNITED STATES PATENT OFFICE 2,569,375

MANUFACTURE OF SULFUR

George H. Grove, Nitro, W. Va., assignor to Monsanto Chemical Company, St. Louis, Mo., a corporation of Delaware Application July 24, 1947, Serial No. 763,336

11 Claims. (Cl. 23—224)

This invention relates to the production of sulfur and more particularly to the production of sulfur mu which is that form of sulfur characterized by its insolubility in carbon disulfide.

While insoluble sulfur may be prepared by several different methods, the present invention is concerned with the method which comprises cooling suddenly a mass of sulfur.

When elemental sulfur, as for example flowers of sulfur or crude sulfur, is heated to a temperature above its melting point a gradual transformation into the insoluble modification occurs. While there is no general agreement as to whether there is a particular critical temperature above which the change takes place, or whether there is an equilibrium reaction which is gradually shifted further in the direction of insoluble sulfur as the temperature rises, nevertheless, heating ordinary sulfur produces a substantial proportion of the insoluble modification. However, the reverse reaction sets in when the sulfur is cooled so that if heating is discontinued and the mass allowed gradually to cool to room temperature, little insoluble sulfur remains. On the other hand, if the mass is cooled suddenly the sulfur solidifies before equilibrium is reached and mixtures of soluble and insoluble sulfur containing the latter in a form reasonably stable at ordinary temperatures have been produced.

The methods heretofore proposed for quenching the molten mass of sulfur to produce a useful commercial product involve passing molten sulfur in a spray or thin stream or sulfur vapor into a cooling liquid. A wide variety of agents have been proposed for this purpose among which are cold water, ice, ether, liquid air, sulfuric acid, nitric acid and other liquids. None of these methods have proved to be very efficient. Furthermore, the super-cooled product is in an amorphous plastic state difficult to process.

An object of this invention is to provide an improved process for the manufacture of insoluble sulfur. A specific object is to provide an improved means of quenching molten sulfur. A further particular object is to provide an improved means of converting molten sulfur mu to a hard product of commerce. Another object is to provide a means of increasing the efficiency of production of insoluble sulfur. A still further object is to eliminate the quenching fluid in the manufacture of insoluble sulfur. Still another object is to eliminate a drying operation. Other and further objects will in part be apparent and in part particularly pointed out in the detailed description following.

In accordance with this invention sulfur is produced by introducing hot molten sulfur or sulfur vapor into a moving stream of gas to produce plastic sulfur and then masticating it to obtain a hard grindable product. Quenching sulfur in a moving gas stream, as for example by suddenly releasing a compressed gas near the point of emergence of the hot sulfur, has been found to provide a high yield of insoluble sulfur. In addition, mastication of the plastic sulfur has been found to quickly convert it to a hard inelastic friable product.

Although the invention is not limited to any theory of its mechanism, it is believed that the moving gas stream serves the dual purpose of absorbing heat from the hot sulfur and of producing sulfur in very finely divided form. The formation of very finely divided particles of amorphous sulfur permits rapid dissipation of the heat so that in effect the second function expedites the first. Unless efficient subdivision of the sulfur particles is achieved, the interior of the masses of sulfur retain considerable heat so that high reversion losses take place during the gradual cooling of the interior. In addition, quenching by means of a moving gas stream has the further advantage that the gas may serve as a mode of conveyance for the sulfur. The direction of flow can be regulated so as to carry the sulfur particles to a collection unit. For instance, the sulfur may be projected onto the exterior surface of a rotating hollow drum where the particles coalesce into a continuous ribbon. The sulfur at this point is in the form of plastic stringy somewhat elastic material difficult to handle and process but the gas quenching operation permits convenient continuous collection of the plastic sulfur.

The nature of the gas is not important so long as objectionable reaction with the sulfur does not take place or the gas cause reversion to the soluble modification. Ammonia, for example, is a catalyst for the conversion of insoluble to soluble sulfur. On the other hand, steam is a satisfactory gas and if there is no further contact with water, drying of the sulfur is unnecessary since it has been found that the final product generally contains less than 0.2% water when steam is employed as the quenching agent. Examples of other suitable gases which may be employed in the present process are flue gas, carbon dioxide, air, nitrogen, sulfur dioxide, and the like. Naturally, it is preferred to employ a gas which is neither combustible nor promotes combustion of the sulfur. In this connection, no tendency to ignite was observed when sulfur at 400° C. was dispersed with dry compressed air.

The temperature of the sulfur entering the air stream may vary but in general it is necessary to heat sulfur above 200° C. to assure the presence of a substantial proportion of insoluble sulfur. Where desired the sulfur may be heated to boiling and introduced into the gas stream as a vapor but the production capacity of the equipment is augmented by conducting the process with molten sulfur. In order to provide a molten fluid which flows readily, the temperature should be sufficiently high to convert the viscid mass into a mobile liquid. By operating at a temperature above the viscid range of sulfur, the efficiency of the dispersion and cooling is enhanced and results in higher yields of insoluble sulfur. Excellent results have been obtained at temperatures of 350° C. and above. For example, heating sulfur at temperatures within the range of 350–420° C. and quenching in accordance with the present invention gave comparable results.

Certain materials are known to exert a stabilizing effect on insoluble sulfur and prevent reversion especially during processing and the addition of a stabilizer is recommended in connection with the operation of the present process. The stabilizer may be a halogen, as for example bromine, chlorine, or iodine, or a sulfur halogen such as sulfur chloride or sulfur bromide, although other stabilizers are known and may be used if preferred. The stabilizer may be added to the sulfur before quenching or to the quenched sulfur product.

The halogens have the important attribute of increasing the yield of insoluble sulfur from molten sulfur. The reason for this is not entirely clear. The presence of a halogen decreases the viscosity of liquid sulfur and the result may at least in part be explained by the increased fluidity of the molten mass which noticeably improves the efficiency of the quenching operation. On the other hand, the halogen may exert a catalytic inhibiting effect against reversion during quenching. In any event, the yield of insoluble sulfur obtained from quenching molten sulfur containing a halogen is from 10 to 20 percent higher than is obtained under similar conditions in the absence of the halogen. In general, the halogen or sulfur halide is 0.1–1% of the sulfur.

Fig. 1 is a flow sheet of the process. Lump sulfur is transferred directly from box cars into a steam coiled melter provided with an agitator and overflow to a pump sump. The molten sulfur is pumped through a filter to the main storage tank which is kept at a temperature of 140–150° C. This temperature is sufficient not only to keep the sulfur molten but to remove organic impurities and keep the sulfur dry during storage. The molten sulfur from the storage tank is pumped through another filter into a feed tank from which the sulfur is fed into the furnace for heating to final temperature. The feed tank is fitted with equipment for adding bromine or other stabilizer. Satisfactory stabilization is obtained by adding one-third of one percent by weight of bromine to the molten sulfur. The sulfur-bromine mixture flowing from the feed tank at about 150° C. is heated to about 390–395° C. by means of a gas fired furnace or other suitable equipment. The stabilized sulfur at a temperature of approximately 400° C. then flows into a moving gas stream in the unit designated as "disperser." Here the sulfur is dispersed in finely divided form, quickly cooled and carried to the collection unit all by means of the gas stream.

Further cooling takes place in the collecting unit. While the product may be collected in cold water, this introduces the necessity for a drying step. Therefore, the collecting unit is preferably a rotating hollow cylinder internally cooled by means of brine. The finely divided sulfur is made to impinge against the cold roll from which it is collected as a continuous ribbon of plastic sulfur and passed directly to a masticator where mechanical work is done on it. For this purpose a masticating extruder, a Banbury mixer, a rubber mill or series of rolls such as commonly used in the rubber industry, or other equipment adapted for the mastication of tough plastic products may be employed. The mechanical working produces a partial cure or hardening of the plastic sulfur so that numerous veins and streaks of hard particles appear. Most of the elasticity is gone although the mass usually retains some flexibility. Final curing of the product can then be completed in a short time.

The sulfur from the masticator is then subjected to final curing which merely consists in mildly heating the sulfur. The curing is so far advanced by the masticating operation that the final curing may be conducted in a continuous manner instead of batchwise. Accordingly, the sulfur by means of a conveyor is continuously passed through a tunnel heated at 30–50° C. While still higher temperatures may be used, noticeable reversion to soluble sulfur takes place above 50° C. even when the heating is of short duration. The optimum temperature of the curing tunnel is about 35° C. The completely vitrified product from the final curing unit is discharged into a crusher and finally ground and classified into the particle size desired. The grinding is conveniently carried out in a jacketed mill which is kept cold by the flow of brine through the jacket. This prevents the sulfur particles from reverting. The ground sulfur, screened to final uniform particle size, is then bagged for shipment.

Figure 2:
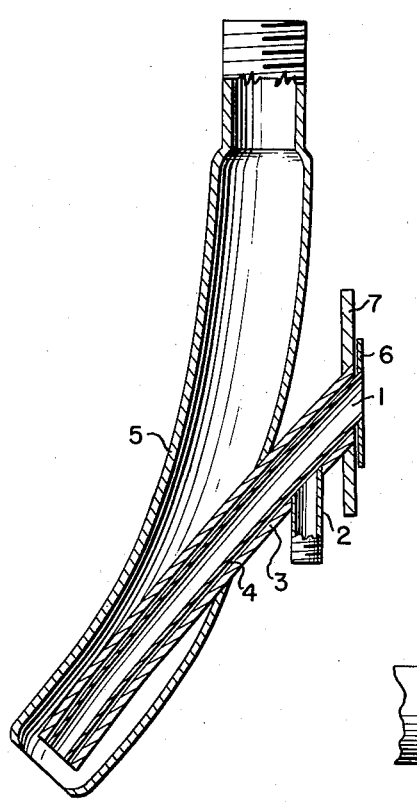
Figure 3:
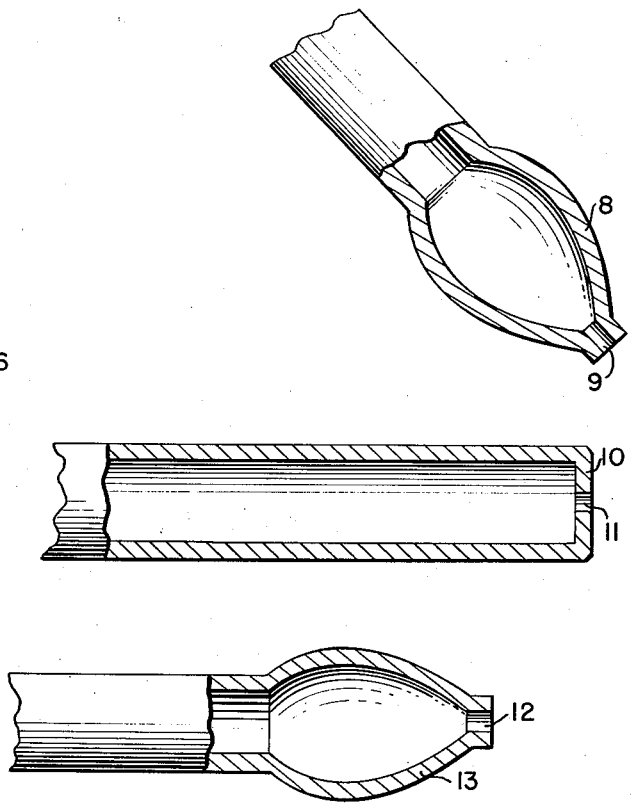
Figure 4:
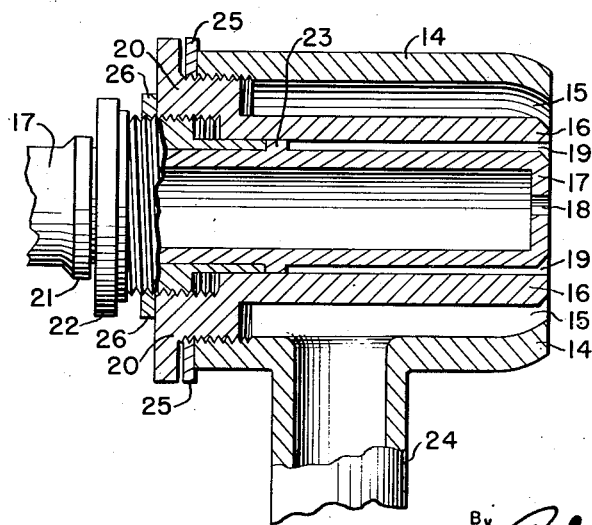

Figures 2, 3, and 4 illustrate in detail various modifications of the dispersing unit. Referring to Fig. 2, the molten sulfur flows into inner pipe 1 which is secured to the final sulfur heating unit by means of flange 6. Surrounding the sulfur feed pipe is a second pipe 3, secured by flange 7. Gas enters the space 4 between the sulfur feed pipe and the outer shell through the inlet pipe 2. The exit end of the system is surrounded by pipe 5 through which steam is passed. The latter supplements the dispersing action of the gas flowing through space 4 and in addition keeps the sulfur in molten condition until it leaves the nozzle tip, thereby preventing solidification and plugging of the sulfur feed.

Fig. 3 shows another arrangement for dispersing and cooling sulfur. Molten sulfur at approximately 400° C. and which preferably contains a halogen stabilizer enters pipe 10 and flows from outlet 11. The stream of hot molten sulfur is struck by two streams of gas from slits 9 and 12 in the jets 8 and 13 positioned above and below the sulfur outlet. It will be appreciated that the position of the gas outlets 9 and 12 relative to the sulfur outlet may be varied but the particular arrangement illustrated has proved to be very efficient. The lower jet is arranged nearly parallel with the sulfur outlet. This gas stream together with the pressure on the sulfur would ordinarily carry the stream nearly intact some distance from the outlet. However, the jet above the sulfur is positioned at an acute angle nearly perpendicular to the sulfur outlet. This forces the sulfur stream across the direction of flow of the gas below resulting in a fine mist of sulfur which quickly solidifies. Cooling of the sulfur is nearly completed by the time it reaches the collecting unit as shown by temperature measurements at various distances from the outlets. Temperatures were recorded by means of a potentiometer and thermocouple employing steam as a dispersing agent. The steam entered the jets at a pressure of 100 lbs./in.$^2$ and a temperature of approximately 164° C. The vapor from the steam outlets at a point just prior to where it struck the sulfur stream was 63–66° C. and the sulfur leaving the outlet at 365° C. had dropped approximately 200° C. at a point four inches from the convergence point of the gas stream. At a distance of twelve inches from the point of contact with the steam the temperature was 50–56° C.

Replacement of the steam by an anhydrous gas has certain advantages, one of which is that the temperature of the gas may be considerably lower than the temperature of steam. Accordingly, in another embodiment of the process air from the atmosphere or flue gas from a stack is passed through a drying tower and then compressed to say 50–75 lbs./in.$^2$. The compressed gas is then cooled and introduced into the gas jets as herein described.

Fig. 4 shows an adjustable dispersing jet which in effect consists of three pipes, one inside the other, the exterior one serving as the housing. This arrangement is also adapted for use under anhydrous conditions. The assembly is encased in housing 14 which is in the shape of a T, the bottom of which is fitted with pipe 24 through which a compressed gas enters. The interior of the cross portion of the T bears threads to receive the second pipe 16 which may be rotated within the housing to regulate the flow of gas. The gas entering the housing flows through the space 15 between the interior of the housing and the exterior of the second pipe. That portion of the housing which serves as the tip portion of the gas outlet is tapered so as to direct the flow of gas into the sulfur stream flowing from outlet 18. The interior tip of the gas outlet may be advanced against the tapered portion of the housing to decrease the size of the gas outlet or backed away to increase the size. The proper adjustment can be made by turning the flanged portion 20 of the intermediate pipe. The desired position can then be fixed by means of lock nut 25.

The interior of the intermediate pipe is also threaded to receive adjusting screw 22 inside of which is the sulfur tube 17. The point of emergency of the hot molten sulfur at outlet 18 with respect to the gas outlet may be adjusted by rotating this adjusting screw which works against raised position 23 to advance the sulfur outlet with respect to the housing and intermediate pipe. For reversing the direction the adjustment screw works against raised position 21 and may be secured in any desired position by the lock nut 26.

Between the sulfur tube and the intermediate tube is a space 19 which may be an air space or may be packed with a solid insulating medium. Insulation of the sulfur tube by an air pocket or other suitable medium is desirable to prevent cooling of the sulfur before it leaves the system. However, upon leaving the system the molten sulfur stream is struck by the impinging gas stream surrounding the outlet, which as hereinbefore explained, quickly cools the sulfur and carries it to the collecting unit.

While the invention has been illustrated by reference to specific embodiments and examples thereof, it is by no means limited thereto. Modifications and changes that can be made without departing from the spirit or scope of the present invention will be apparent. The invention is limited solely by the claims attached hereto as part of the present invention.

What is claimed is:

1. The method of producing sulfur which comprises introducing a stream of molten sulfur at a temperature above 200° C. into a stream of an expanding gas substantially inert to sulfur, condensing the sulfur to a plastic state, collecting and then masticating the condensed sulfur.

2. The method of producing sulfur which comprises introducing a stream of molten sulfur at a temperature of about 400° C. into a stream of an expanding gas stream directed against a rotating drum, collecting the sulfur on the drum and then masticating the condensed sulfur.

3. The method of producing sulfur which comprises introducing a stream of molten sulfur containing a halogen at a temperature of about 400° C. into a stream of an expanding gas stream directed against a rotating drum, collecting the sulfur on the drum and then masticating the condensed sulfur.

4. The method of producing sulfur which comprises introducing a stream of molten sulfur containing a small amount of bromine at a temperature of about 400° C. into a cold stream of expanding gas directed against the surface of a cold rotating collecting roll and then masticating the condensed sulfur.

5. The method of producing sulfur which comprises introducing a stream of molten sulfur at a temperature of about 400° C. into an anhydrous cold expanding gas stream near the point of maximum expansion rate, said gas stream being directed against a cold rotating collecting drum, masticating the condensed sulfur to partially vitrify same and completing the vitrification by gentle heating.

6. The method of producing sulfur which comprises introducing a stream of molten sulfur at a temperature of about 400° C. into an anhydrous cold expanding gas stream near the point of maximum expansion rate, said gas stream being directed against a cold rotating collecting drum, masticating the condensed sulfur to partially vitrify same and heating at 30–80° C. until the vitrification is complete and a grindable product formed.

7. The method of producing sulfur which comprises introducing a stream of molten sulfur containing a small proportion of bromine at a temperature of about 400° C. into an anhydrous cold expanding gas stream near the point of maximum expansion rate, said gas stream being directed against a cold rotating collecting drum, masticating the condensed sulfur to partially vitrify same and heating at 30–80° C. until the vitrification is complete and a grindable product formed.

8. The method of producing sulfur which includes the following steps: introducing a stream of molten sulfur at about 400° C. into an expanding gas stream to cool quickly and condense the sulfur to a plastic state, collecting and masticating the condensed sulfur product and treating the sulfur with a stabilizer for sulfur mu.

9. The method of producing sulfur which includes the following steps: introducing a stream of molten sulfur at about 400° C. into a cold expanding stream of an anhydrous gas substantially inert to sulfur to cool quickly and condense the sulfur to a plastic state, collecting and masticating the plastic sulfur to at least partially vitrify same and treating the sulfur with a halogen stabilizer.

10. The method of producing sulfur which comprises introducing a stream of molten sulfur containing a halogen at a temperature of about 400° C. into expanding steam, collecting plastic sulfur and masticating the condensed sulfur.

11. The method of producing sulfur which comprises introducing a stream of molten sulfur containing a halogen at a temperature of about 400° C. into expanding steam, collecting plastic sulfur in water, masticating and drying the condensed sulfur.

GEORGE H. GROVE.

REFERENCES CITED

The following references are of record in the file of this patent:

UNITED STATES PATENTS

| Number | Name | Date |
|---|---|---|
| 1,859,992 | Seil | May 24, 1932 |
| 2,061,185 | Ceccon | Nov. 17, 1936 |
| 2,419,310 | Belchetz | Apr. 22, 1947 |
| 2,419,324 | Missbach | Apr. 22, 1947 |

OTHER REFERENCES

Mellor: Inorganic and Theoretical Chemistry, vol. 10, pages 31 and 32. Pub. in 1930 by Longmans, Green & Co., London.